United States Patent [19]

Hug

[11] 4,249,670

[45] Feb. 10, 1981

[54] QUICK DISCONNECT CAP HAVING PRESSURE VENTING MEANS

[75] Inventor: Charles R. Hug, Santa Rosa, Calif.

[73] Assignee: The United States of America as represented by the Secretary of the Navy, Washington, D.C.

[21] Appl. No.: 93,483

[22] Filed: Nov. 13, 1979

[51] Int. Cl.³ .................... B65D 43/38; B65D 43/40; B65D 39/00
[52] U.S. Cl. .................................. 220/295; 220/303; 220/367; 220/293
[58] Field of Search ............... 220/293, 295, 302, 303, 220/367; 138/89

[56] References Cited

U.S. PATENT DOCUMENTS

| 656,201 | 8/1900 | Meredith | 220/303 X |
|---|---|---|---|
| 1,586,273 | 5/1926 | Wall | 220/334 |
| 3,405,839 | 10/1968 | Saarem | 220/293 |
| 3,821,970 | 7/1974 | Affa | 138/89 |

Primary Examiner—George T. Hall
Attorney, Agent, or Firm—R. S. Sciascia; Charles D. B. Curry; George L. Craig

[57] ABSTRACT

A pressure-tight cap assembly providing a leak-proof seal against positive internal tank pressure. Tank pressure may be vented prior to unlocking and removing the cap. The cap assembly incorporates an external adaptor with ears and slots in its outside circumference to be permanently threaded onto the tank outlet pipe and a quick-disconnect cap containing a spring. The spring fits inside the adaptor and the cap slides over the adaptor and locks onto the adaptor by means of cylindrical pins on its inside diameter received by the slots of the adaptor. A rubber O-ring fits between the outer diameter of the adaptor and the inner diameter of the cap and cooperates with the spring to provide both a leak-proof seal and a means for venting tank pressure.

7 Claims, 3 Drawing Figures

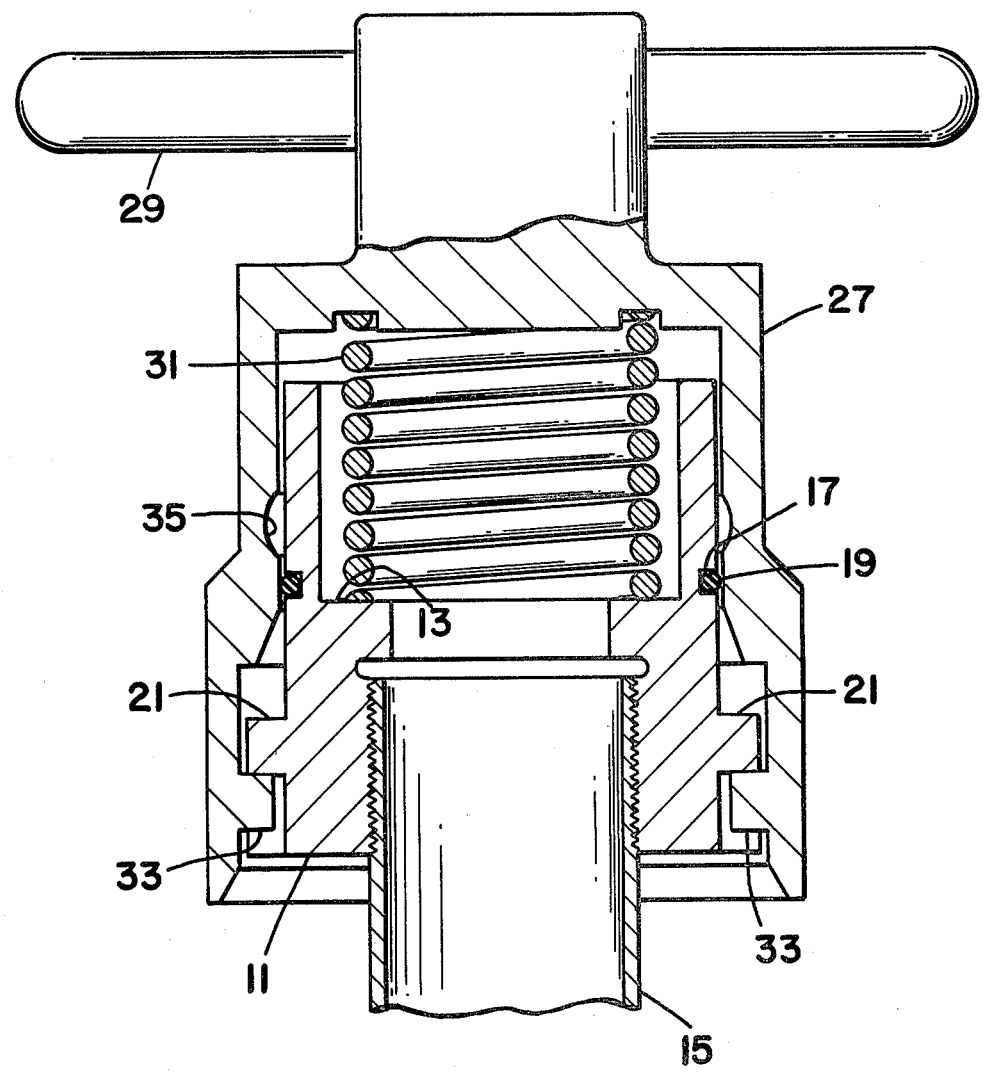
FIG _ 1

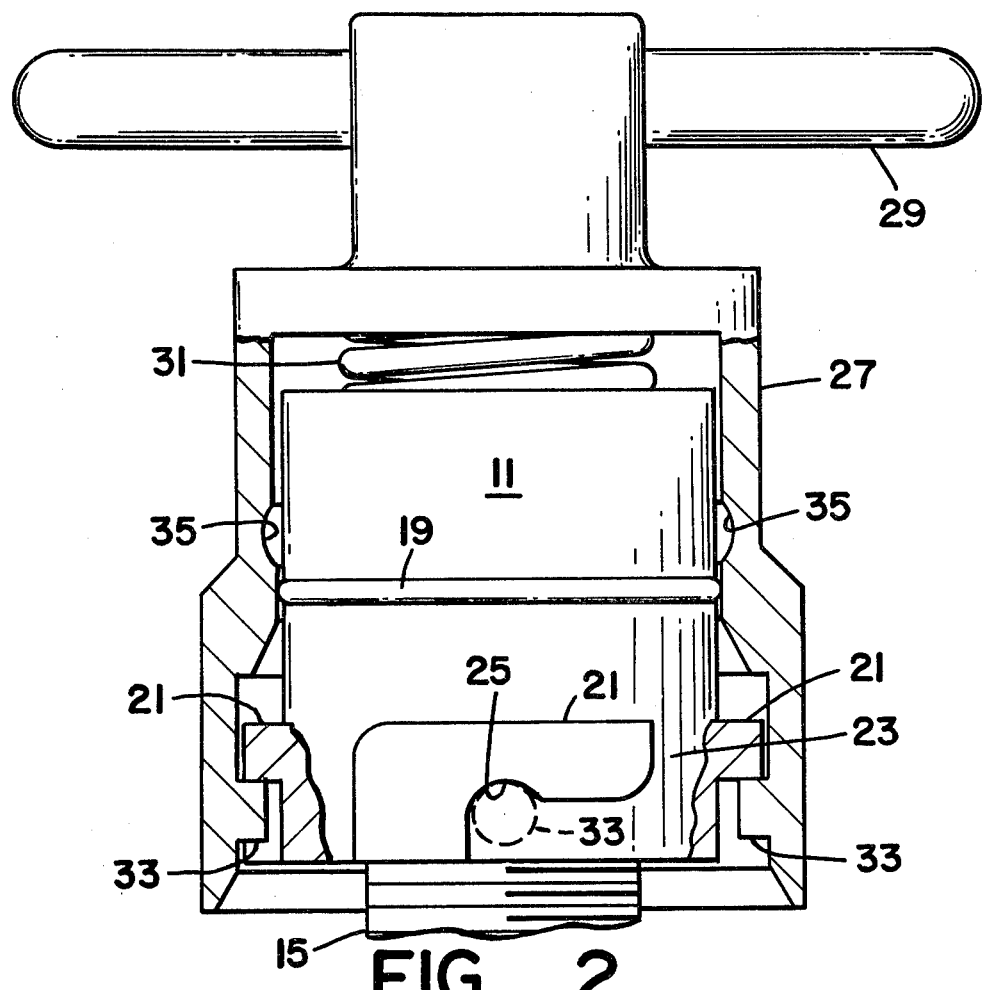
FIG_2
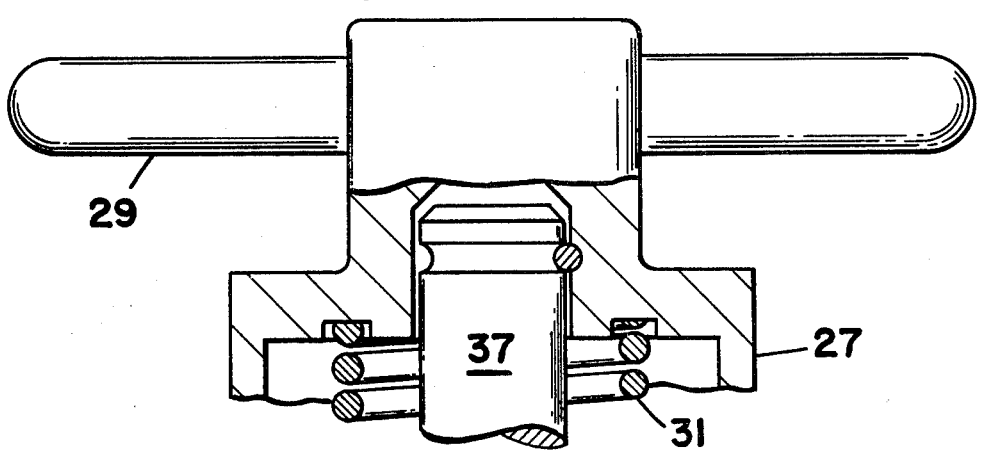
FIG_3

QUICK DISCONNECT CAP HAVING PRESSURE VENTING MEANS

BACKGROUND OF THE INVENTION

1. Field of the Invention

This invention relates to quick-disconnect, leak-proof cap assemblies for containers. In a primary application, the invention relates to a quick-disconnect, leak-proof cap assembly for containers having positive internal pressure where the internal pressure may be safely vented through the cap prior to disconnecting the cap from the container.

2. Description of Prior art

Containers for gases and liquids frequently have positive internal pressure relative to pressure outside the container and require pressure-light, leak-proof cap assemblies on container outlets. Common examples of such containers are gas containers, fuel tanks, radiators and the like. Typically, such caps are specially designed for the particular container outlet or work cooperatively with an adaptor fitting for the outlet where either the cap or adaptor or both contain a sealing means for protection against loss of contents or pressure from the container.

Frequently, such caps are not made to disconnect quickly and easily and are either threaded on or are held in place by threaded nuts requiring wrenches for removal. Threads tend to wear out with use or corrode by interaction with the contained material or the external environment limiting the lifetime and usefulness of the cap. Some quick-disconnect cap assemblies are found in the prior art which avoid this limitation. A more serious limitation, however, exists with all such cap assemblies, quick-disconnect and otherwise that poses a distinct safety hazard. That limitation is the inability to vent the internal pressure of the container prior to release and removal of the cap. The instant invention provides a leak-proof, quick-disconnect cap assembly that also permits such venting of internal pressure of a container and subsequent safe removal of the cap.

SUMMARY OF THE INVENTION

A pressure-tight cap assembly for a liquid or gas container is briefly described providing both a leak-proof seal and a means for safely venting container internal pressure prior to unlocking and removing the cap. The cap assembly incorporates an external adaptor having ears and slots in its external circumference to be permanently threaded onto the container outlet and a quick-disconnect cap containing cylindrical pins on its inner circumference and a spring. The cap slides over and the spring slides inside the adaptor and the cap is then locked onto the adaptor by means of the slots and ears of the adaptor receiving the pins of the cap. A rubber O-ring fits between the outer diameter of the adaptor and the inner diameter of the cap and cooperates with the spring to provide both a leak-proof seal and a means for venting internal pressure of the container.

A primary object of invention is to provide a leak-proof, pressure-tight, quick-disconnect cap assembly for containers. A further object of invention is to provide a leak-proof, pressure-tight, quick-disconnect cap assembly, for containers that provides for safe venting of internal container pressure before release and removal of the cap.

BRIEF DESCRIPTION OF THE DRAWINGS

FIG. 1 shows a cross-section view of the cap assembly.

FIG. 2 shows a cross-section view of the cap and an external view of the adaptor.

FIG. 3 shows a partial cross-section view of an alternate embodiment of the cap assembly.

DESCRIPTION OF THE PREFERRED EMBODIMENT

Referring to FIG. 1 and FIG. 2, a hollow cylindrical adaptor 11 having an inner circumferential shoulder 13 threads permanently onto the outlet 15 of a container, not shown. The adaptor 11 has a circumferential sealing channel 17 in its outer surface enclosing an "O" ring 19 having diameter greater than the width of the circumferential sealing channel 17. The adaptor 11 has ears 21 and slots 23 in its bottom outside circumference and recesses 25 in each ear 21. The cap 27 has the general form of a hollow cylinder having an open end to receive the adaptor 11 and a closed end with a handle 29 for attaching and removing the cap 27. There is space between all inner surfaces of the cap 27 and all outer surfaces of the adaptor 11. The cap incorporates a compression ring 31 permanently attached to the inside diameter of the cap 27 and having diameter greater than that of the shoulder 13. The cap 27 further incorporates cylindrical pins 33 around the inside bottom of the cap 27 equal in number to the ears 21 and slots 23 of the adaptor 11 and equally spaced around the inside diameter so as to align with the slots 23 and recesses 25 in the ears 21. A narrow circumferential groove 35 is cut into the upper inner surface of the cap 27 such that it lies above and adjacent to the circumferential sealing channel 17 and "O" ring 19. FIG. 3 shows an alternate embodiment of the cap 27 wherein a sounding rod 37 or similar structure is permanently attached interior to the compression spring 31 to the inside top of the cap 27 and permits checking of liquids within the container.

In operation, the adaptor 11 is threaded onto the outlet 15 and then the cap 27 is placed over the adaptor 11 while guiding the compression spring 31 into the adaptor. The cap 27 is rotated until the pins 33 align with the slots 23 and then forced down against the compression force of the spring 31 interacting with the shoulder 13 until the pins 33 can be rotated into alignment with the recesses 25 in the ears 21. The cap 27 is then released, the compression ring 31 forces the cap 27 and pins 33 upward into the recesses 25 locking the cap 27 into a seated position and a pressure tight seal is formed between the "O" ring and the inner surface of the cap 27. Any pressure build up in the container increases the tightness of the lock and seal.

Before removal of the cap 27, downward pressure is exerted on the cap 27 until groove 35 slides over the "O" ring 19 and sealing channel 17 breaking the pressure-tight seal and allowing container pressure to safely vent between cap 27 and adaptor 11 before the cap 27 is rotated into the unlocked position with pins 33 aligned with slots 23 and removed.

The instant invention thus permits installation of quick disconnect caps on containers and permits safe venting of container pressure prior to unlocking and removal of the cap.

What is claimed is:

1. A quick-disconnect cap assembly comprising:

(a) means for adapting said cap assembly to the outlet of a container for gas or liquid;

(b) means for releasably capping said adapting means, said capping means having an approximately hollow cylindrical formation and a lower open and an upper closed end;

(c) means for resiliently holding said capping means over said adapting means, said holding means inside of and attached to said closed end of said capping means and fitting slidably inside said adapting means;

(d) means for forming a pressure-tight seal between said capping means and said adapting means; and (e) means for venting pressure inside said container between said capping means and said adapting means prior to removal of said capping means.

2. A quick-disconnect cap assembly as recited in claim 1 wherein said adapting means further comprises:

(a) a hollow cylinder open at both ends and having a thin circumferential shoulder formed on the inner wall of said cylinder at approximately the longitudinal mid-point of said cylinder, said inner wall of said cylinder having a threaded surface from one end of said cylinder to said shoulder and having a smooth surface from the opposite side of said shoulder to the other end of said cylinder;

(b) a circumferential channel in the outer surface of said cylinder receiving said forming means, said channel opposite said smooth inner wall of said cylinder and longitudinally displaced from and adjacent to said shoulder of said cylinder; and (c) means for releasably interlocking said adapting means with said capping means, said interlocking means formed on said outer surface of said cylinder opposite said threaded surface of said cylinder.

3. A quick-disconnect cap assembly as recited in claim 1 wherein said capping means further comprises:

(a) a handle attached to the outer surface of said capping means to said closed end; and (b) a plurality of cylindrical extensions arrayed on the inner circumferential surface near said open end of said capping means, said cylindrical extensions arranged such that they cooperate with said interlocking means to secure said capping means to said adapting means.

4. A quick-disconnect cap assembly as recited in claim 1 wherein said holding means is a spring.

5. A quick-disconnect cap assembly as recited in claim 1 wherein said forming means is a "O" ring.

6. A quick-disconnect cap assembly as recited in claim 1 wherein said venting means is a shallow circumferential groove in said upper end of said capping means opposite and longitudinally displaced from said forming means such that when said capping means is pressed downward over said adapting means against the force of said spring, said shallow circumferential groove overlays said forming means breaking said pressure-tight seal and permitting venting of pressure of said container between said capping means and said adapting means.

7. A quick-disconnect pressure-tight cap assembly for an outlet of a container holding a substance comprising:

(a) adaptor for said outlet, said adaptor having a partially threaded interior portion for attachment to said outlet, a central bore and a plurality of ears arrayed on its outer circumference;

(b) cap for slidably receiving said adaptor, said cap having a plurality of pins arrayed on its inner circumference such that said pins cooperatively interlock with said ears of said adaptor to secure said cap to said adaptor;

(c) means for forming a pressure-tight seal between said cap and said adaptor; and (d) means for venting the pressure of said container between said cap and said adaptor prior to unlocking said cap from said adaptor.

* * * * *